United States Patent Office 2,733,976
Patented Feb. 7, 1956

2,733,976

SULFONATED 5-ACYLAMINO-1,9-ISOTHIAZOL-ANTHRONES

Paul Bücheler and Albin Peter, Binningen, Switzerland, assignors to Sandoz A. G., Basel, Switzerland No Drawing. Application September 15, 1955, Serial No. 534,606

Claims priority, application Switzerland September 17, 1954

8 Claims. (Cl. 8—55)

The present invention relates to valuable acid dyestuffs of the isothiazolanthrone series.

The said dyestuffs of the present invention are obtained by reacting 5-acylamino-1,9-isothiazolanthrones, wherein the acyl group is a halogen fatty acid acyl, with alkali metal bisulfites.

In carrying out the reaction, the acylaminoisothiazolanthrone is heated with an aqueous solution of the alkali metal sulfite at about 100–150° C. until all the water-insoluble starting material has been consumed. The reaction can be facilitated by the addition of a hydrophilic solvent, such as an alcohol or a phenol, to the reaction mixture. The reaction involves replacement of the halogen atom by the sulfonic acid group. Any minor quantity of non-reacting water-insoluble impurities can be removed by filtering the aqueous solution of the reaction product. Any added organic solvent is advantageously removed by steam distillation, prior to the filtration. The resultant dyestuff is precipitated from the clarified solution by salting out, after which it is filtered off and dried.

As stated, the acyl radical of the starting compounds of the invention are of the halogen fatty acid series. Of primary suitability are the low molecular acyl radicals which contain up to 6 carbon atoms. The halogen atoms are preferably chlorine or bromine atoms; the position of substitution is not important, in so far as the successful carrying out of the reaction is concerned. The fatty acid radical present in the starting material can thus be for example the radical of chloracetic acid, 1-chloropropionic acid, 1-bromopropionic acid, 2-chloropropionic acid, 1-bromobutyric acid, 1-bromovalerianic acid, 1-bromocaproic acid, 5-bromocaproic acid, etc.

The new dyestuffs of the isothiazolanthrone series thus obtained correspond to the formula

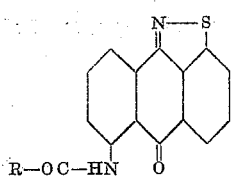

wherein R stands for a sulfonated alkyl group. They dissolve in water, yielding a yellow-colored solution, and dye nitrogenous fibers such as wool, silk and synthetic polyamides in yellow shades from such solution. Fibers of polyacrylonitrile and mixed polymers thereof are dyed by the cupro-ion method in yellow shades of excellent fastness to washing and to light.

The following examples illustrate the invention without, however, being limitative thereof. In these examples, the parts and percentages are by weight, and the temperatures are in degrees centigrade.

Example 1

10 parts of 5-chloroacetylamino-1,9-isothiazolanthrone, 30 parts of phenol, 65 parts of aqueous sodium bisulfite solution (40%) and 34 parts of aqueous sodium hydroxide solution (30%) are stirred together at 100°. As soon as a test specimen is for the most part soluble in hot water, the reaction mass is poured into 1000 parts of water. The solution is heated to 95°, filtered hot, and 100 parts of sodium sulfate added. The acid dyestuff, which precipitates on cooling, corresponds to the formula

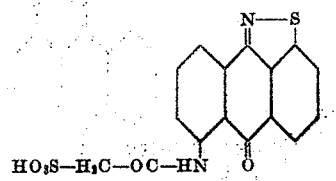

it is filtered off with suction, washed with aqueous sodium sulfate solution (10%) until the filtrate is free from phenol and shows a neutral reaction, and is dried. Polyacrylonitrile fibers and fabric can be dyed with the so-obtained dyestuff by the cupro-ion method in yellow shades of excellent fastness to light and to washing.

Example 2

5 parts of 5-(2'-chloro)-propionylamino-1,9-isothiazolanthrone, 65 parts of aqueous sodium bisulfite solution (40%) and 34 parts of aqueous sodium hydroxide solution (30%) are stirred together for 7 hours at 130° in an autoclave. The reaction mass is poured into 1000 parts of water and heated to 95°. The hot solution is filtered and 100 parts of sodium sulfate added. The precipitate which separates out on cooling is filtered off with suction, washed with aqueous sodium sulfate solution (10%), and dried. The so-obtained acid dyestuff, which corresponds to the formula

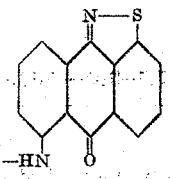

dyes fibers and fabrics of wool, silk, or synthetic polyamides in bright yellow shades, from acid solution. Polyacrylonitrile fibers and fabric can be dyed with the said dyestuff by the cupro-ion method in yellow shades of excellent fastness to light and to washing.

Example 3

11 parts of 5-(1'-bromo)-propionylamino-1,9-isothiazolanthrone, 30 parts of n-propyl alcohol and 50 parts of neutral aqueous potassium sulfite solution (50%) are stirred together at 100° until a test specimen is for the most part soluble in hot water. The reaction mass is then heated to 98° in 800 parts of water, the solution filtered and the formed acid dyestuff precipitated by the addition of potassium sulfate. The dyestuff, which corresponds to the formula

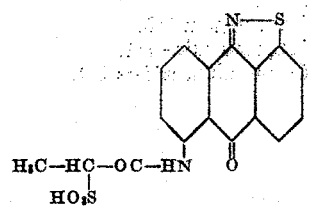

is filtered off with suction, washed with aqueous potassium sulfate solution (8%), and dried. The so-obtained acid dyestuff possesses properties similar to those of the product according to Example 2.

The following table lists additional acid dyestuffs which can be prepared from the enumerated 5-halogenacylamino-1,9-isothiazolanthrones by reaction with alkali metal sulfite after the manner of the preceding examples:

| Example No. | 5-Halogenacylamino-1,9-Isothiazolanthrone | Shade of Dyeing on Polyacrylonitrile |
|---|---|---|
| 4 | 5-(1'-bromo)-isovalerylamino-1,9-isothiazolanthrone<br>Formula of Product:<br>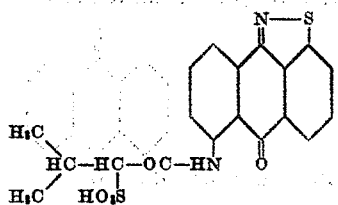 | yellow. |
| 5 | 5-(1'-bromo)-capronylamino-1,9-isothiazolanthrone<br>Formula of Product:<br>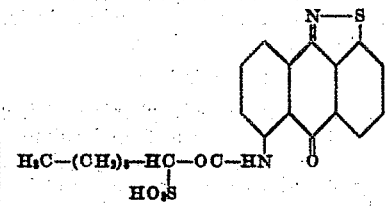 | yellow. |
| 6 | 5-(5'-bromo)-capronylamino-1,9-isothiazolanthrone<br>Formula of Product:<br>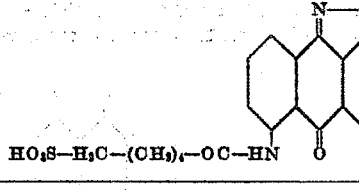 | yellow. |

*Example 7*

100 parts of a washed skein or hank of polyacrylonitrile (staple fiber) are introduced at 70° into a dyebath which contains 20 parts of a copper screen or netting made of wires of 0.2 mm. diameter and which also contains a solution of 1 part of the dyestuff obtained according to Example 1, 1 part of crystalline copper sulfate, 4 parts of concentrated formic acid and 4000 parts of water. The bath is heated to boiling; at the end of an 80-minute boiling period, the bath is completely exhausted and the textile material is dyed a fast yellow.

*Example 8*

A fabric of polyacrylonitrile staple fiber is printed with a paste of the following composition:

30 parts of the dyestuff according to Example 2,
50 parts of butyl carbitol,
310 parts of water,
500 parts of crystal gum 1:2,
50 parts of cuprous oxide 1:1,
60 parts of ammonium sulfate 1:2.
―――
1000 parts.

The print is dried, steamed for 10 minutes at 104° without pressure and for 20 minutes at about 110° and at 1.5 atmospheres pressure, then rinsed well with cold water, soaped at 50–60° with a fatty acid condensate and rinsed again. A full yellow print of very good fastness to light, to washing and to rubbing is obtained.

Having thus disclosed the invention, what is claimed is:

1. An isothiazolanthrone dyestuff of the formula

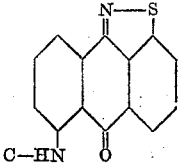

wherein R is a sulfonated lower alkyl group.

2. The isothiazolanthrone dyestuff of the formula

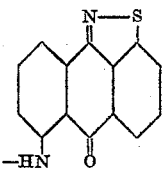

3. The isothiazolanthrone dyestuff of the formula

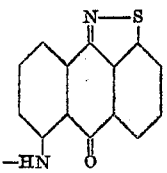

4. The isothiazolanthrone dyestuff of the formula

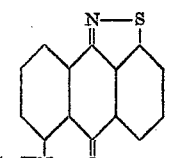

5. The isothiazolanthrone dyestuff of the formula

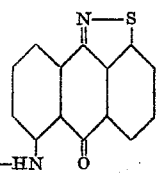

6. The isothiazolanthrone dyestuff of the formula

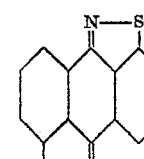

7. Hydrophobic fiber material dyed with a product as defined in claim 1.

8. Acrylic polymer dyed with a product as defined in claim 1.

No references cited.